Patented June 21, 1949

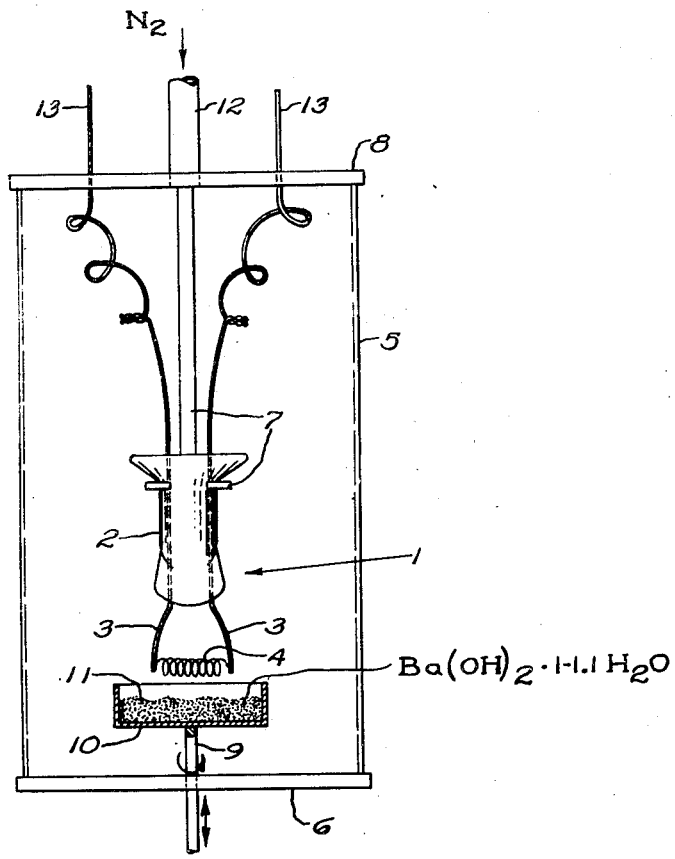

2,473,900

UNITED STATES PATENT OFFICE 2,473,900

ELECTRODE COATING PROCESS

René Penon, St. Cloud, and Pierre Lemaigre-Voreaux, Paris, France, assignors to General Electric Company, a corporation of New York Application July 8, 1947, Serial No. 759,590
In France January 15, 1942

Section 1, Public Law 690, August 8, 1946
Patent expires January 15, 1962

2 Claims. (Cl. 316—20)

This invention relates to improvements in electron emissive electrodes for electric discharge tubes or devices; it is particularly adapted to devices involving a discharge in a gaseous atmosphere as for example, fluorescent lamps, which are started instantaneously by a relatively high voltage, that is, without preheating of the electrodes.

Such electrodes are mainly composed of a refractory metal, which hereinafter will be referred to as the supporting or base metal, and which is covered or coated with an oxide or usually with a mixture of alkaline-earth oxides to which other chemical compounds may be added.

In order to obtain the desired coating of emissive oxides on the base metal, a substance is used which breaks down to the oxide upon suitable heat treatment. The materials which have been proposed for this purpose have been extremely varied; however, it is customary in practice to employ the hydroxides or the carbonates of the alkaline-earth metals. To coat the base metal with said materials various methods of application may be resorted to, involving possibly a binder, or pulverization, or brushing, or immersion in a liquid solution or a suspension containing that material, etc.

In electrodes thus manufactured and employing carbonates, the deposit or coating which is obtained has relatively little adherence to the base, and for this reason these electrodes are adversely affected by instant starting. At the moment of starting the discharge subjects certain parts of the coating to rather strong tearing stresses or bombardment, and it has been therefore the general practice to preheat these electrodes (directly or indirectly) by passage of current therethrough prior to the application of the starting voltage.

When the hydroxides are used as a starting material for the emissive coating, a much better adherence can be obtained; however, in this case the emitting deposit or coating has not heretofore been entirely satisfactory with regard to regularity or uniformity, homogeneity, degree of activation and constancy in the emissive properties of the active layer. Besides, and especially in the case of mercury-vapor devices, considerable blackening appears, after a certain operating time, on the walls of the discharge tube near the electrodes, and the purity of the atmosphere in the device is impaired during the operation of the device. Finally, in the prior practices, the "formation" or processing of the discharge device is a laborious process requiring generally prolonged heat and evacuation treatments, since this formation process involves either the decomposition of the carbonates (in order to eliminate the carbon dioxide) or the dehydration of the hydroxide.

The purpose of the present invention is to obviate the aforesaid disadvantages by furnishing highly adherent, homogeneous and regular emissive deposits, which nevertheless can be relatively thick and provide a particularly high electron emission and considerable constancy throughout the life of the device, its formation being obtained within a very short time.

According to our invention, which relates to the prior practice wherein the manufacture of the emissive deposit is started with homogeneous material containing, by analysis barium oxide (BaO) and water, the material which is used for the deposit (which at ordinary temperature is in powder form) is one having, by analysis, a composition corresponding to the simultaneous presence of barium hydroxide, $Ba(OH)_2$, and water of crystallization, in the proportions of 1 gram molecule of hydroxide for a water content ranging between 1 and 1.1 gram molecule, said material being deposited on the metal base without any previous addition of water.

The starting material may contain as "impurity" traces of barium carbonate which, of course, must be disregarded in the analytical determination of the very accurate proportion of hydroxide and water.

The material involved is obtained, for instance, by the slow dehydration, possibly in vacuo, of commercial barium hydroxide octohydrate, $Ba(OH)_2 + 8(H_2O)$. To this end, the commercial hydrate, after it has been thoroughly crushed, may be subjected to a partial vacuum at a slowly-increasing temperature, which is sufficiently low at any instant that no liquid phase will appear during the dehydration. For instance, the treatment is started at 70° C. and, after one hour, the temperature is gradually raised to 125° C. at the end of six hours, under a vacuum of 20 cm. of mercury.

A steam condenser, which has been suitably gauged and graduated, permits collecting and measuring the amount of water extracted from the treated mass. The dehydration is stopped when the collected quantity of water indicates the remaining solid to have the composition $Ba(OH)_2 + 1.05H_2O$, for example. It will be understood, in view of the precision with which the degree of hydration must be accomplished, that one must start with a product of absolutely constant composition and of a very definite water content, and that, besides, it is advisable to check, by careful chemical analysis, the water content of the material obtained.

It is also possible to produce said material by hydration, starting with a less hydrated compound, such as barium oxide, BaO, or barium hydroxide, Ba(OH)$_2$. The material is finely subdivided and carefully applied in a thin layer. After that, water vapor is applied to it at a low partial pressure, for instance of the order of the pressure of saturated vapor at ambient temperature, the application lasting a certain time which may vary with the partial pressure that has been chosen. This period may even last several days, and it must be noted that it would not amount to the same thing to incorporate into the hydroxide (when against starting with that substance) liquid water, were it even in small quantities at a time; for then the result would be a viscous material and not the solid material of the invention.

It is also to be remarked that better results are obtained when the degree of hydration exceeds 1.01H$_2$O for 1Ba(OH)$_2$. The best results were obtained for water contents ranging between 1.03 and 1.07H$_2$O. As for the chemical composition of the materials which were obtained as described and fall within the narrow limits defined above, it is plausible to assume that they consist of the monohydrate of barium hydroxide, Ba(OH)$_2 \cdot$H$_2$O, with, possibly, small amounts of either barium hydroxide octohydrate and water, or only water.

Regardless of the procedure which is used, there can be manufactured in one operation and under the best conditions, rather large quantities of materials which permit making deposits or coatings on several thousands or tens of thousands of electrodes.

However, it has been noted that the material which is obtained may not be sufficiently homogeneous, although it may correspond quite well on the average with the preferred degree of hydration 1.05H$_2$O. Such a lack of homogeneity is bound to be particularly harmful in view of the fact that the quantity of material used for an electrode is generally very slight. Therefore in order to obtain the necessary homogeneity, according to the present invention, the above-described material is enclosed in an evacuated, sealed bulb and heated for several hours to a temperature of 100° C., for example. Since the material easily absorbs water vapor and carbon dioxide and must consequently be protected from any contact with air, it is left within the bulb. However, the reaction with water vapor and carbon dioxide does not occur so rapidly that the necessary manipulations could not be carried out in air.

In order to apply this material in a regular, uniform layer on the base metal, it is best to employ fusion in an inert gas—the material being deposited in any suitable way on the metal—at a relatively high pressure, for instance atmospheric pressure, avoiding carefully the presence of water vapor and carbon dioxide, for our material would then have its chemical composition altered at the moment of fusion. Moreover, it is necessary to operate at a rather low temperature, the maximum being in the region where the material is heated to a red heat; in this way, the formation of bubbles in the liquid will be avoided. The viscosity of this liquid is such that it spreads rapidly by capillarity on the surfaces of the base metal (which are to be coated with the emissive substance) regardless of their shape. In other words, the liquid fills any interstices on the surfaces, and a very strong adherence is obtained.

It is also advantageous to select the shape and the dimensions of the base metal in such a way that the aforesaid liquid may spread as evenly as possible.

For a further understanding of the invention, reference may be had to the drawing which is a somewhat diagrammatic elevation of apparatus which may be employed to apply the coating material to an electrode.

The coating may be applied in the following manner: The mount 1 of the electric discharge device comprises a glass stem tube 2 through which is sealed one or a pair of lead-in wires 3, 3 which support, by its ends, the electrode base metal consisting of a helically coiled or coiled-coil wire 4 with the turns but slightly spaced apart. The axis of this helix or coil is at right angles to that of the stem tube. The mount 1 is supported in a vertical position, with the coil downward, within a glass tube or jar 5 whose lower part is closed by a plate 6. The amount may be held in a suitable holder or clamp 7 depending from a plate 8. A shaft 9 passes through the plate 6 by way of a leakproof joint; the upper end of this shaft terminates in a small cup 10 in which a certain amount of the powdered coating material 11 to be used is placed. A nitrogen stream is passed through the tube 5 by way of a conduit 12, and the small cup 10 is moved in a vertical direction so that the material 11 comes in contact with the electrode coil, and by rotational motion of the cup some of the material is worked into the coil. Particles of the material may be also placed without drawback on the outer surface of the coil. Then, the material having been placed in position in contact with the electrode, a suitable electric current is sent directly through the wire by way of conductors 13, or by high-frequency induction, so as to melt the material contained in the electrode 4 without causing any lumps. The current is interrupted as soon as the material has flowed on the surface of the coil in the manner described aforesaid, and the operation may be repeated several times depending upon the thickness of the deposit which is needed or desired.

If, after application of the layer of material, it is desired to temporarily interrupt the manufacture of the electrode, said electrode must be protected in the meanwhile from the action of air, to which action it is highly sensitive. To this end, the electrode may be covered with a thin layer of a substance which will insulate it from the air, for instance paraffin. It is also possible to mount or seal the electrode immediately within the discharge device, evacuate the latter and fill it then, as the case may be, with an inert gas.

After that come the operations involving the "formation" and activation of the electrode, which are greatly simplified according to this invention. One method consists in heating in vacuo, gradually if necessary, the electrodes by passing an electric current therethrough for only a few minutes or a fraction of a minute. The base metal coil may be, for example, of tantalum. The duration and degree of the heat treatment may be easily found after a few tests for each type of device; the aim being to stop the treatment just before the moment when a blackish deposit (due to the condensation of barium) appears on the wall of the device near the electrode.

In the case of a discharge tube which is intended to operate in a gaseous atmosphere, a few moderate discharges are started in a gas at current densities of the order of the current for which the device is rated. After a careful evacuation, the device is filled with the desired gas or gases, at the desired pressure, and then the tube or container is sealed.

According to another method, the base metal being made of moylbdenum, for instance, the device is subjected to a sustained vacuum while being heated, as in an oven. Inasmuch as the electrodes have not been heated by passage of current therethrough or only but slightly treated in this manner, they are raised to a high temperature by the passage of an electric discharge of increasing intensity in a gaseous atmosphere. After that, the device is again evacuated and subjected to another clean up. If the device is to operate in a mercury-vapor atmosphere, the required quantity of mercury is introduced only towards the end or at the end of the formation process, at least after the electrodes have been subjected to a high temperature as a result of the discharge. This process is in contrast with the known one which consists in bringing the electrodes to a high temperature by an intensive electric discharge in a mercury-vapor atmosphere.

It has been found that as a result of the method described herein, owing to the nature of the emissive deposit (as just outlined), and particularly when the gaseous atmosphere contains mercury vapor, the appearance of black spots on the walls near the electrodes is avoided or at least considerably retarded. As a matter of fact, these black spots then appear only toward the end of the life of the device, for instance after several thousands of operating hours. In contrast to this, the emissive deposits obtained when starting from the usual hydrates rapidly result in a blackening whose opacity increases gradually during the time of service. In the case of a fluorescent tube or lamp, the blackening impairs the esthetic appearance of the tube from the very beginning, and it continues to lower the luminous efficiency.

In a discharge tube in which electrodes are used which have been formed according to the process described above, it is possible to observe, with a spectroscope, the presence of hydrogen near the electrodes, especially at the moment when the discharge begins. This is a particularly advantageous feature in view of the fact that hydrogen, when coming in contact with an electrode having an emissive coating, increases the emission of that electrode, as has already been pointed out in the literature.

Adherence to the narrow limits of the water content of the material is essential if the desired results are to be obtained. However, it has not been possible as yet to determine accurately the role of the various factors that are involved. Account must be taken of the known fact that the behavior of an electrode depends on the body with which that electrode is coated and on the manner in which the coating has been attained. In the case of the present invention, this behavior must be related (particularly as regards the quality of the electrode and its preservation during the life of the device) to the degree of hydration of the material that is initially applied to the base metal, or at least to the degree of hydration of the surface of the material which is in contact with the base metal, also to the successive variations of this degree of hydration during the treatments which transform the material into an emissive substance.

Moreover, it must be noted that within the limits provided, the fusion of the material proceeds at a relatively low temperature, even at atmospheric pressure. For this reason, the fusion can be carried out without involving a noticeable absorption of the inert gases by the base metal and without lowering the mechanical strength of the latter. Neither will the fusion result in the formation of harmful bubbles; and all this is accomplished by passage of an electric current which flows through the base metal. Finally, owing to the combination of favorable circumstances, the fusion imparts to the molten material (even if present as a powder on the base metal) an appropriate degree of fluidity which will permit its uniform and strongly adherent distribution on the base metal.

As regards the unfavorable results which were obtained with low degrees of hydration of the material (less than $1H_2O$), especially with reference to the adhesion and evenness of the emissive coating, it may be assumed that they are due to the presence of some anhydrous barium hydroxide, which may cause changes in the properties of the coating material which are bound to interfere with the production of a good electrode.

As regards the water contents exceeding $1.1H_2O$, they give rise within the mass of the material and during the treatments to which it must be subjected for its transformation into active substance, either to cavities, that is to say, regions in which the material does not cover the body of the electrode or to excrescences which entail later on the tearing off of the emissive substance at the moment of starting and during the steady state of the discharge device. This formation of cavities or excrescences may be explained by the high water vapor pressure resulting from a dehydration of the system formed by barium hydroxide, $Ba(OH)_2$, and water, when carried out to an extent corresponding to water contents exceeding $1.1H_2O$. According to Lescoeur (Comptes-Rendus Academie des Sciences, v. 96, p. 1578, 1883) the water vapor pressure of this system at 100° C., as a function of its water content, rises abruptly to 500 mm. mercury for products having more than 1.27 mols of water, while below 1.27 $H_2O$, the vapor pressure remains almost constant at 43 mm. up to a certain degree of hydration, whereupon it drops down to a very low value, or even zero for $Ba(OH)_2$. The extraction, through heating, of the water of hydration therefore proceeds much more evenly for water contents below the higher limit fixed by the invention, a feature which tends to demonstrate that the defects pointed out for contents exceeding $1.1H_2O$ would be due to blisters or bubbles caused by a more or less violent evaporation of the water in the material.

Experience has shown that the electrodes made in accordance with the present invention will noticeably reduce the starting voltage of discharge tubes having a gaseous atmosphere, to the extent that they will permit, especially if they are provided with auxiliary electrodes, their being started in the cold state (i. e., without preheating by passage of current therethrough), the voltage being simply the low A.-C. potential of the conventional A.-C. distribution systems, for instance 110 volts. This lowering of the starting voltage or ignition voltage is retained with remarkable constancy throughout the life of the tube.

Besides thermionic electrodes of the type described above, the present invention is also applicable to the making of electrodes for the so-called "cold" cathode high voltage luminescent discharge tubes containing rare gases or mercury, and with or without coatings of solid fluorescent powders on the inner surfaces of the tubes. Such "cold" electrodes are made of sheet metal, usually of cylindrical or cup-shaped form. Under these conditions, the electrode may have very small dimensions, its volume amounting only to 1 cubic millimeter or at the most a few cubic millimeters for current densities of the order of 100 milliamperes. Thus, in the assembly of signs, letters or other designs employing such tubes, it is possible to avoid the undesirable long dark ends of individual tubes such as result from the use of the large conventional electrodes. The use of the electrodes built in accordance with the invention also permits a considerable reduction in the size and quality of safety devices for protection against high voltages, which devices must be applied to the ends of the tubes.

The present invention is also applicable to the construction of mercury-vapor devices, for instance devices involving a high mercury-vapor pressure, especially those used as sources of ultra-violet radiations.

It is to be noted that if the barium in the material described is replaced by strontium, the results will be less favorable, and contrary to the results obtained in the case of barium, they are best for degrees of hydration above those we have pointed out. Moreover, when the strontium material is applied, the time of "formation" or processing of the device is comparatively long. Mixtures of this material with a material according to the invention have not given as good results as the material of the invention alone.

What we claim as new and desire to secure by Letters Patent of the United States is:

1. The method of activating electrodes of mercury vapor electric discharge devices which comprises applying thereto a homogeneous powdered composition of barium hydroxide containing, by analysis, between 1 and 1.1 gram molecules of water of crystallization to 1 gram molecule of the hydroxide, heating the electrode in an atmosphere of a non-oxidizing gas to fuse the said composition and cause it to spread over the electrode, passing an electric discharge through the device in a gaseous atmosphere devoid of mercury vapor to decompose the said composition, pumping out gaseous products evolved during the decomposition of said composition, and then introducing mercury into the device.

2. The method of activating electrodes of electric discharge devices which comprises the steps of dehydrating barium hydrate, $Ba(OH)_2 \cdot 8H_2O$, to a composition containing, by analysis, between 1 and 1.1 gram molecules of water of crystallization to 1 gram molecule of the hydroxide, subjecting said composition to a prolonged heating in an evacuated space to render it substantially homogeneous, applying the composition to an electrode and heating said composition to decompose it.

RENÉ PENON.
PIERRE LEMAIGRE-VOREAUX.

REFERENCES CITED

The following references are of record in the file of this patent:

UNITED STATES PATENTS

| Number | Name | Date |
|---|---|---|
| 2,007,920 | Braselton | July 9, 1935 |
| 2,275,886 | Bondley | Mar. 10, 1942 |
| 2,290,208 | Quarrie | July 21, 1942 |